United States Patent

[11] 3,584,462

[72] Inventor Phillip Stephen Gadd
 Vancouver, British Columbia, Canada
[21] Appl. No. 857,357
[22] Filed Sept. 12, 1969
[45] Patented June 15, 1971
[73] Assignee Roy F. Gadd
 Huntington Park, Calif.

[54] APPARATUS FOR GATHERING AND CLEANING WATER SURFACES OF POLLUTION
12 Claims, 4 Drawing Figs.

[52] U.S. Cl................................................ 61/1,
 210/170, 210/242
[51] Int. Cl.......................................... E02b 15/04
[50] Field of Search......................................... 61/1;
 210/83, 170, 242

[56] References Cited
UNITED STATES PATENTS
3,184,923 5/1965 Galvaing..................... 61/1

FOREIGN PATENTS
829,756 3/1960 Great Britain............... 61/1

Primary Examiner—Samih N. Zaharna
Attorney—Whann & McManigal

ABSTRACT: Apparatus for gathering and cleaning water surfaces of pollution, debris, and the like, which comprises an elongated floating boom structure which protectively supports a flexible curtain having float means secured along an upper edge and weight means along a submerged edge, the float means and weight means being connected by slack chains to adjacent portions of the floating boom structure so as to maintain the curtain in an effective operating and working position, and wherein the boom structure mounts protective shielding screens for the curtain, and additionally includes upstanding baffles connectable with float means and/or the floating boom structure. In a modified arrangement, pairs of boom structures support a common curtain therebetween, the curtain being secured along its side edges and being downwardly curved to provide an elongate trough or sluice.

PATENTED JUN15 1971 3,584,462
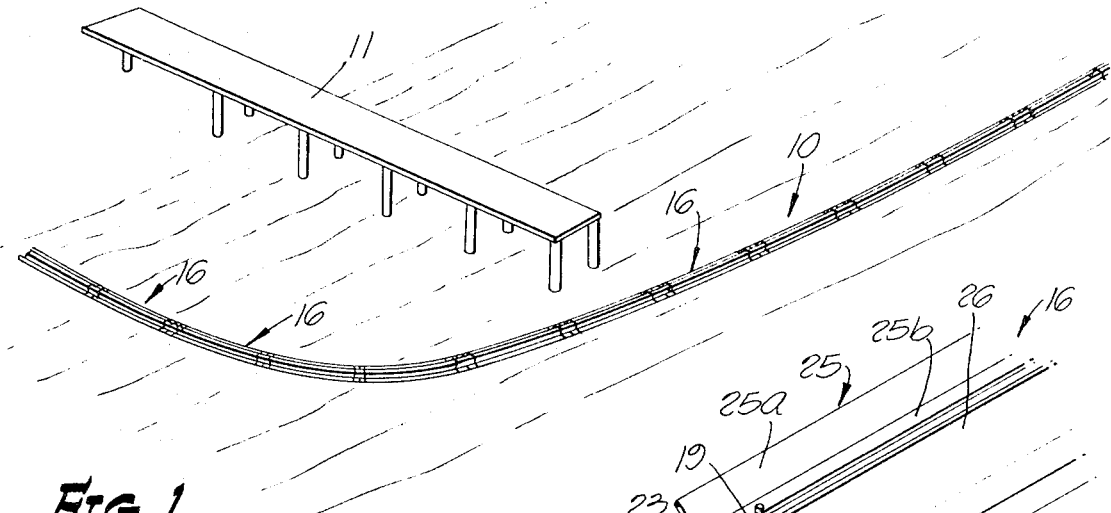
FIG. 1.
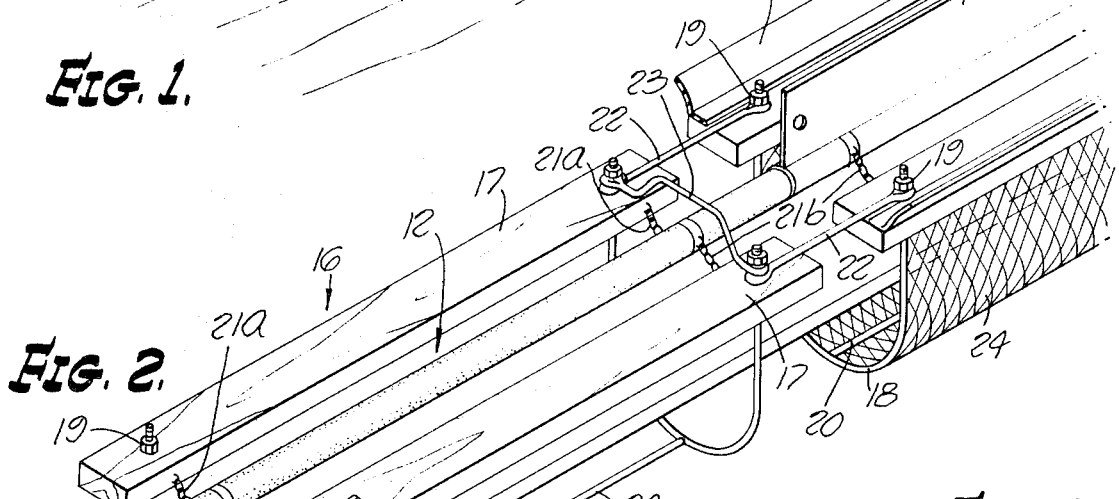
FIG. 2.
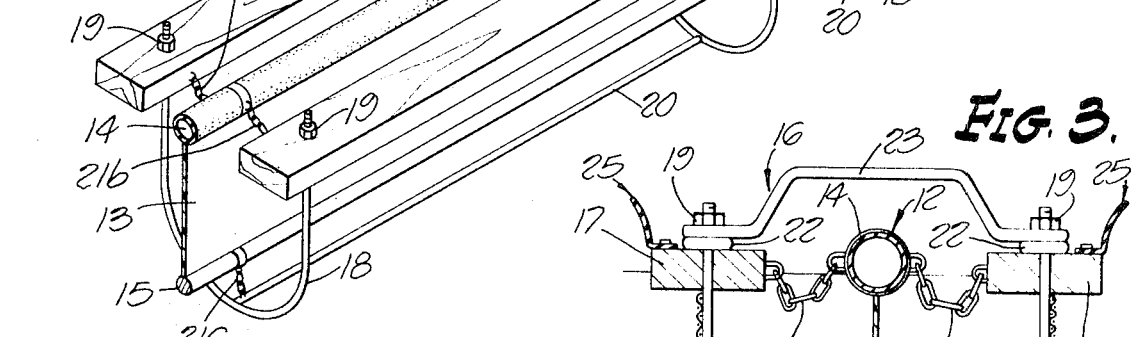
FIG. 3.
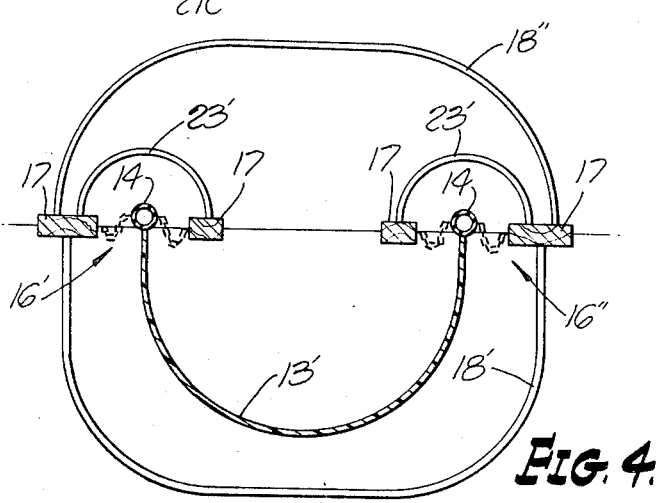
FIG. 4.
PHILLIP STEPHEN GADD
INVENTOR
WHANN & McMANIGAL
Attorneys for Applicant
BY
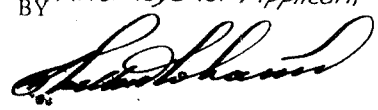

APPARATUS FOR GATHERING AND CLEANING WATER SURFACES OF POLLUTION

BACKGROUND OF THE INVENTION

The present invention relates generally to elongate floating boom structures used for surrounding and confining floating material such as oil, floating debris and the like.

Heretofore, the previously known boom structures of the herein described character have assumed a variety of structural configurations, but have in general embodied an arrangement in which an elongated curtain or panels have been suspended in the water from surface floats or booms in end-to-end relation, these booms being connected along one edge of the curtain or to the panels, and the weights being of to the opposite edges to hold the curtain or panels operatively in a generally upright position with portions of the curtain or panels extending below the water surface.

The prior structures, as noted above, did not always operate satisfactorily under certain conditions. For example, the opposite edges of the curtain could be relatively moved and displaced by waves, wind, currents and other forces to such an extent as to cause the curtain or panels to no longer provide a floating barrier for containing the pollution, debris, and the like. Also, the barrier elements were exposed in such a manner that they could easily become damaged to the extent that their effectiveness was either destroyed or reduced to an undesirable minimum.

The present invention solves the inherent problems and disadvantages of these prior art structures by providing stabilized floating cradles of unique design and construction within which the floating curtain or barrier element is flexibly supported in its operative position for limited movements, but wherein the curtain remains in an effective operating position, even under extremely adverse conditions. Damage to the barrier element is prevented by protective screens carried by the floating cradles, and the effectiveness of operation is further augmented by the use of upstanding baffles carried by either or both of the curtain or cradle structures.

SUMMARY OF THE INVENTION

The present invention relates generally to improvements in floating booms of the type utilized for surrounding and confining floating material, pollutants, debris and other undesirable materials on or contiguous to the upper surface of water areas.

Having in mind the inherent problems and disadvantages of the prior art structures presently available for this purpose, it is one object of the present invention to provide unique means for maintaining the operating efficiency of the apparatus, and to provide a construction which will operate efficiently for long periods of time under both ideal and adverse operating conditions.

A further object of the invention is to provide in apparatus of the herein described character, unique floating cradles for maintaining the operating position of the floating barrier forming curtains, and in which protective screens are supported on the cradles in such a manner as to shield the curtain structure from possible damage by floating debris or other floating or partially submerged foreign matter.

Another object is to provide floating cradles having supporting booms, which may be arranged in pairs and support a curtain of flexible material therebetween, the curtain being attached to the booms along its edges and draped therebetween so as to form a trough or sluice whereby water and other liquids may be conducted from one point to another along a water surface.

Still another object is to augment the effectiveness of the barrier elements, and the ability of the apparatus to contain the floating materials, pollutants, and the like, under adverse weather conditions by providing upstanding baffles which may be attached to either or both of the floating boom cradle structures or to the floats for the curtain.

Yet another object is to provide a cradle structure having floating supporting booms which are so arranged as to provide catwalks along the apparatus to facilitate inspection, servicing, repair, and the like.

Further objects and advantages of the invention will be brought out in the following part of the specification, wherein detailed description is for the purpose of fully disclosing several embodiments of the invention without placing limitations thereon.

BRIEF DESCRIPTION OF THE DRAWINGS

Referring to the accompanying drawings, which are for illustrative purposes only:

FIG. 1 is a pictorial representation showing one way in which the apparatus of the present invention may be utilized, in this case for shielding a pier and adjacent beach areas against water-carried pollutants, debris, and the like;

FIG. 2 is an enlarged fragmentary view in perspective, showing details of construction;

FIG. 3 is a transverse sectional view showing the operative relationship between the floating boom cradle structures, and the floatingly suspended barrier curtain structure; and FIG. 4 is a transverse sectional view of a modified arrangement of the invention, wherein the curtain provides a floatingly suspended trough or slice.

DESCRIPTION OF THE PREFERRED EMBODIMENTS

Referring more specifically to the drawings, for illustrative purposes, the invention is shown in FIG. 1 as comprising an elongate floating boom structure, as generally indicated at 10, and which embodies the features of the hereinafter described invention. As shown, and as illustrative of one manner of utilizing the invention, the floating boom structure is anchored at one end adjacent a beach, which in this case is provided with a pier structure 11. The boom structure is longitudinally carried around the outermost end of the pier and for a considerable distance past the pier so as to form a floating barrier which will be effective to protect and shield the pier and adjacent beach areas against surface pollutants, debris, and other foreign matters which could cause damaging effects of very costly proportions. The apparatus may, of course, be used in other ways, for example, the floating boom structure may be towed over the water surface to confine the surface pollutions and debris within a small area from which it can be gathered or pumped. Since the apparatus is articulated, it may be longitudinally conformed as desired with respect to the area to be protected.

As best shown in FIGS. 2 and 3, the apparatus of the present invention comprises a floating barrier as generally indicated at 12. The barrier comprises an elongate curtain 13 of suitable material such as one of the available plastics. This curtain is attached in any suitable manner along one edge margin to a suitable float 14 which may be variously constructed of any suitable material, and although wood would be suitable, it is preferred to use a Neoprene tubular hose. This float is of continuous length, and may be formed by interconnecting sections in end-to-end relation. The purpose of the float is to suspend the curtain so as to provide a flexible barrier extending below the water surface. In order to normally maintain the curtain in an upright position, it is preferred to attach weight means along the other edge of the curtain material. This weight, while it may constitute separate elements, it is shown herein as comprising a wire rope 15 which is flexible and therefore adapted to conform longitudinally with the position of the float 14.

While the floating barrier as thus far described will function efficiently under normal placid conditions of the water surface, it will be appreciated that under abnormal conditions the floating barrier could be twisted or deformed in a manner to permit the confined materials to pass the barrier. It is a primary feature of the present invention to therefore provide a stabilizing structure in the form of cradle sections as generally indicated at 16, which are arranged to be flexibly joined in end-to-end relation for articulated movement which will permit the sections to conform to the longitudinal direction taken by the float 14.

Each of the cradle sections 16 comprises a pair of boom floats 17–17 of timbers or wood planking which are positioned in parallel relation on opposite sides and outwardly spaced from the adjacent float 14. The boom floats are retained in fixed spaced relation by means of U-frames 18 which have their ends respectively secured to the boom floats as by retaining nuts 19 having threaded engagement with the frame ends. The U-frame extends below the wire rope 15, and if desired, the successive U-frames of the cradle sections may be interconnected at their bottoms by tie members 20.

The floating barrier 12 is supported within the associated cradle sections for limited movement, but held in spaced relation within the cradle by means of a plurality of slack chains 21a and 21 b which connect from the opposite sides of the float 14 to the adjacent ends of the boom floats 17–17, and by slack chains 21c which connect from the wire rope 15 to the underlying portion of the U-frame 18. Thus, the curtain will have limited movement within the cradle sections, but will be stabilized into an effective position within the cradle structure under wave, wind and other adverse conditions.

The successive cradle sections 16 are flexibly interconnected by connecting links 22 between the spaced ends of the boom floats on each side, these links having end eyelets adapted to loosely engage the ends of the adjacent U-frames of the sections. While the U-frames ordinarily are sufficient to maintain the spacing of the booms 17–17 of each section, additional cross-tie members, as indicated at 23 may be provided between the ends of the U-frames. The cross-tie members 23 are preferably provided with bowed or offset portions between their ends so as to provide increased clearance above the underlying float 14. With the cradle sections thus interconnected in end-to-end relation, the boom floats 17 provide catwalks on opposite sides of the sections, whereby it is possible for a person to walk along the apparatus and inspect the various elements or make repairs, if necessary.

The U-frames, as shown, also serve the important function of providing a framework structure upon which there is mounted a mesh screen 24 which provides protective shielding for the floating barrier structure 12. Although not shown, it is contemplated that if desired a similar screen could extend above the floating barrier.

As an additional feature, splash barriers may be mounted on either or both of the boom floats, and floats 14 in order to more effectively contain the foreign matter. These splash barriers may take the form of flexible elongate baffles 25 secured to the boom float, the baffle being shown as having angularly extending side margins 25a and 25 b so that when one of the margins is connected to the float boom, the other will extend above the float boom and form a baffle. As exemplary of the baffle which is connected with the float 14, this baffle as indicated at 26 is shown as of elongate rigid plate construction which may be secured in any appropriate manner to the float 14 as by suitable clamping bands or other conventional means.

A modified structure embodying the features of the present invention is shown in FIG. 4, wherein a pair of cradle sections 16′–16κ are secured together in spaced relation by means of U-frames 18′ which extend below the surface of the water, and U-frames 18″ shown as extending above the surface of the water. In this arrangement, the curtain, as indicated at 13′, has its marginal edges connected to the floats 14–14 of the sections 16′, 16″ and the curtain is draped or hung so as to be downwardly curved and form a flexible trough or slice extending lengthwise of the interconnected end-to-end sections. Means are thus provided whereby the trough may be utilized for the transport of liquid therealong which is kept separated from the liquid outside the trough.

From the foregoing description and drawings, it will be clearly evident that the delineated objects and features of the invention will be accomplished.

Various modifications may suggest themselves to those skilled in the art without departing from the spirit of my invention, and, hence, I do not wish to be restricted to the specific form shown or uses mentioned.

I claim:

1. Apparatus for gathering and cleaning water surfaces of pollution, comprising:
   a. a continuous elongated flexible curtain having longitudinal opposite side edges;
   b. float means secured to and extending along one of said side edges;
   c. weight means secured to and extending along the other of said side edges, said float means and weight means coacting to position said curtain in a generally upright position extending below the surface of the water; and
   d. a plurality of cradle frame assemblies connected in end-to-end relation along said curtain, said cradles having boom float members positioned on opposite sides of said float means; and
   e. flexible connections between said float means and said weight means, respectively, and parts of said cradle assemblies for maintaining said curtain in a position between the boom float members of said cradle assemblies.

2. Apparatus according to claim 1, wherein the float means includes a tubular member of plastic material.

3. Apparatus according to claim 1, wherein the weight member is a flexible wire rope.

4. Apparatus according to claim 1, wherein the cradle boom float members provide catwalks, and in which the boom float members on opposite sides of the curtain are interconnected by rigid spacing frame members.

5. Apparatus according to claim 4, wherein the spacing frame members include U-frames extending below and around the weight means.

6. Apparatus according to claim 4, wherein the spacing frame members include cross-ties extending above the float means.

7. Apparatus according to claim 5, wherein the flexible connections include slack chains connecting the float means with he adjacent boom float members on opposite sides thereof, and other slack chains, each connecting the weight means with a U-frame.

8. Apparatus according to claim 4, wherein the spacing frame members support a protective screen.

9. Apparatus according to claim 5, including a screen supported by said U-frames, said screen extending substantially from a boom float member on one side, below the weight means and substantially to a boom float member on the other side of said curtain.

10. Apparatus according to claim 1, including elongated, longitudinally extending upstanding baffle members carried by the boom float members.

11. Apparatus according to claim 1, including elongated longitudinally extending upstanding baffle means carried by said float means.

12. Apparatus of the character described, comprising:
   a. a plurality of pairs of cradle frame assemblies, connected in end-to-end relation, each of said pairs including one set of fixedly spaced boom floats fixedly connected in spaced relation to another set of fixed spaced boom floats;
   b. elongate float means extending longitudinally between the boom floats of each of said sets;
   c. flexible connections between the float means and the adjacent boom floats of each set; and
   d. an elongated sheet of flexible material having side edges, one of said edges being secured to the float means of said one set and the other side edge being secured to the float means of said another set, with the flexible material providing a trough extending longitudinally thereof.